United States Patent [19]

Pelosini et al.

[11] 4,241,037

[45] Dec. 23, 1980

[54] PROCESS FOR PURIFYING SILICON

[75] Inventors: Luigi Pelosini, Fontaneto; Alessandro Parisi, Novara; Sergio Pizzini, Sesto Calende, all of Italy

[73] Assignee: Montedison S.p.A., Milan, Italy

[21] Appl. No.: 91,750

[22] Filed: Nov. 6, 1979

[30] Foreign Application Priority Data

Nov. 9, 1978 [IT] Italy ................................ 29622 A/78

[51] Int. Cl.³ .............................................. C01B 33/02
[52] U.S. Cl. ................................................... 423/348
[58] Field of Search ........................................ 423/348

[56] References Cited

U.S. PATENT DOCUMENTS

| | | | |
|---|---|---|---|
| 1,037,713 | 9/1912 | Allen | 423/348 |
| 2,866,701 | 12/1958 | Strauss | 423/348 X |
| 2,885,364 | 5/1959 | Swartz | 423/348 X |
| 3,012,865 | 12/1961 | Pellin | 423/348 X |
| 3,148,131 | 9/1964 | Coursier | 423/348 X |
| 3,442,622 | 5/1969 | Monnier et al. | 423/348 X |
| 4,092,446 | 5/1978 | Padovani et al. | 423/348 X |
| 4,102,764 | 7/1978 | Harvey et al. | 423/348 X |
| 4,124,410 | 11/1978 | Kotval et al. | 423/350 X |

FOREIGN PATENT DOCUMENTS 907855 10/1962 United Kingdom ..................... 423/348

*Primary Examiner*—Jack Cooper
*Attorney, Agent, or Firm*—Stevens, Davis, Miller & Mosher

[57] ABSTRACT

A process is disclosed for purifying silicon wherein silicon in the molten state is reacted with barium carbonate and/or oxide and/or hydroxide and then, after cooling and crushing, leached with one or more dilute inorganic acids. Preferably an oxidizing gas such as oxygen or water vapor is blown into the molten mass during the reaction, which is conducted at a temperature in the range of from 1550° to 2000° C. The inorganic acid may be for example hydrochloric acid, hydrofluoric acid, nitric acid, sulphuric acid, or mixtures thereof.

4 Claims, No Drawings

PROCESS FOR PURIFYING SILICON

This invention relates to a process for purifying silicon and, more particularly, for purifying metallurgical grade silicon in order to obtain solar grade silicon.

It is well known that silicon can be employed as starting material in the manufacture of solar cells for generating electric energy by means of the photovoltaic effect, i.e. in devices permitting a direct conversion of solar energy into electricity.

On the other hand it is also well known that the silicon suitable for use in solar cells, which is called solar grade silicon, must possess a chemical purity much higher than that of metallurgical silicon, but it may contain a total amount of impurities exceeding that of an electronic grade silicon.

As is well known, if an electronic grade silicon (i.e. the silicon produced and commercialized at present for electronic applications) should be used to manufacture solar cells, the cost per kWh (kilowatt-hour) so produced would exceed the cost of the kWh produced according to conventional methods.

Another basic parameter to be taken into consideration when producing silicon for solar applications, namely a silicon by means of which energy shall be generated from solar energy, is the energy content that the production process introduces into the silicon and that, of course, must be much lower than the energy the solar cells will be able to provide. This energy content is measured by a factor known as "pay back time", i.e. the time during which the device must operate in order to generate energy in an amount equal to its own energy content. At present such time is about 10 years. An analysis of the process employed at present for producing electronic grade silicon, and consisting in producing trichlorosilane by reaction with hydrogen and chlorine from metallurgical silicon, in successively purifying and depositing silicon in the form of bars in resistance-heated reactors, reveals that more than 90% of the energy is consumed in the silicon-depositing process. As a consequence the practical importance becomes very evident of having available processes which permit one to purify metallurgical grade silicon at such costs as to render the energy produced by photovoltaic conversion competitive with energy from other sources.

The processes heretofore proposed for preparing solar grade silicon, starting from metallurgical silicon, are generally based on the following operations: washing with acids, scorifying, blowing in reacting gases, or evaporation under vacuum. These processes, however, have not yet proved effective for removing some types of impurities particularly detrimental in solar grade silicon, such as aluminum, boron and phosphorus.

It is an object of this invention, therefore, to provide a simple and economical process which permits one to purify metallurgical silicon to obtain a solar grade silicon.

It is another object of the invention to provide a process for purifying metallurgical silicon which shall be particularly effective towards objectionable impurities such as aluminum, boron and phosphorus.

In accordance with the present invention, it has been found that the impurities contained in metallurgical silicon (such as, e.g., Al, P, B, Fe, Ti, Cr, V, Zr and Ni) can be efficaciously removed if the metallurgical silicon is treated in the molten state with barium carbonate and/or barium oxide and/or barium hydroxide and, after cooling and crushing, is then leached with dilute inorganic acids.

In particular it has been found that it is possible, by operating in this manner, to reduce the Al content to less than 1 ppmw (parts per million by weight), the P content to 1 ppmw (and even less), and the B content to 5 ppmw (and even less), reducing at the same time the total amount of the other metal impurities to less than 1.5 ppmw.

It is within the scope of the present invention, therefore, to provide a process for purifying metallurgical silicon, characterized in that silicon in the molten state is reacted with barium carbonate and/or oxide and/or hydroxide and then, after cooling and crushing, leaching with one or more dilute inorganic acids.

In practice, the process of the present invention can be utilized for purifying the metallurgical silicon which is produced in arc furnaces by carbon reduction.

By way of example, the impurities contained in metallurgical silicon are generally the following:
B=20–40 ppmw, Al=20,000–30,000 ppmw, P=50–100 ppmw, Ti=1,000–2,000 ppmw, V=800–1,200 ppmw, Cr=2,000–2,500 ppmw, Fe=30,000–40,000 ppmw, Ni=1,500–1,800 ppmw, Zr=80–100 ppmw.

In a practical embodiment of the process of this invention, the addition of barium carbonate and/or oxide and/or hydroxide can be effected directly in the ladle into which the silicon produced in the arc furnace is poured.

As an alternative, it may be convenient to start from solid metallurgical silicon, to melt it in a proper furnace, and then to pour it into a vessel in which barium carbonate and/or oxide and/or hydroxide is already present or is successively added.

In still another embodiment, one may mix the metallurgical silicon in the form of powder or clumps with the barium carbonate and/or oxide and/or hydroxide, and then melt the system so obtained.

During the treatment the temperature of the molten mass is maintained at 1550°–2000° C., and preferably at 1600°–1750° C.

The added amount of barium carbonate and/or oxide and/or hydroxide depends on the content of impurities present in the silicon. Generally this amount will vary between 5 and 30% by weight in respect of the weight of the silicon to be purified.

During the purification treatment, the molten mass should be suitably kept under stirring and said stirring is advantageously obtained by blowing in an oxidizing gas, preferably water vapor or oxygen, through the vessel bottom. In fact the presence of an oxidizing gas permits one to obtain a higher degree of purification.

After a treatment time of the order of a few hours, for example from 1 to 6 hours, the molten mass is poured into an ingot mold and allowed to cool, preferably to room temperature.

The ingots obtained after cooling are subjected to mechanical crushing. The dimensions of the resulting clumps are not critical. Generally good results are achieved with size of a few centimeters, e.g. from 5–10 cm.

The clumps of silicon thus obtained are leached with a dilute inorganic acid such as, for example, hydrochloric acid, hydrofluoric acid, nitric acid, sulphuric acid, or mixtures thereof.

Leaching is carried out at a temperature ranging from room temperature to 80° C., generally employing acids in an aqueous solution at a 5–20% concentration and ratios by weight between the acid solution and the silicon between 1.5 and 5.

The duration of leaching is an inverse function of the temperature and will usually range from 20 to 50 hours.

At the conclusion of leaching, and after washing and filtering, a silicon is obtained in which B is present in an amount not exceeding 5 ppmw, P in an amount not exceeding 1 ppmw, and Al in an amount lower than 1 ppmw, while the total amount of other metal impurities is less than 1.5 ppmw.

The process according to the present invention, because it permits one to eliminate the deposition procedure which is essential for preparing electronic grade silicon, drastically reduces the "pay back time" of the silicon thereby produced, thus rendering the silicon employable for solar applications in an economical manner.

The process of ths invention is particularly interesting and attractive for large-scale production when coupled with the large-scale production of conventional metallurgical grade silicon, but it can also be employed in connection with the use of furnaces of lesser capacity.

The silicon purified according to this invention can be subjected to a directional solidification, whereby polycrystals suited to the direct fabrication of solar cells are readily obtained.

The following examples are given in order still better to illustrate the advantages and characteristic features of the present invention, without however any limitation thereof.

EXAMPLE 1

20 kg of metallurgical silicon were poured into a ladle at a temperature of 1550° C.

The average content of the main impurities, determined on a sample by means of mass spectrophotometry and expressed in ppmw, was the following:

B=26.1; Al=22,600; P=83.8; Ti=1,410; V=938; Cr=2,240; Fe=34,500; Ni=1,660; Zr=90.3.

40 kg of $BaCO_3$ had been previously introduced into the ladle bottom.

Stirring of the molten product was obtained by blowing in oxygen from the bottom. Reaction was conducted for 1 hour, whereupon the product was poured into an ingot mold and allowed to cool down.

The silicon thus obtained was crushed to a size of approximately 20–50 mm. The pieces digested for 48 hours in 400 liters of an aqueous solution containing 10% by weight of HCl and 10% by weight of HF.

A silicon powder having a particle size of from 0.5 to 2 mm was thus obtained, which was then washed and filtered.

The impurities content of this product determined by mass spectrophotometry and expressed in ppmw, was as follows:

B=4; Al=0.1; P=0.1; Ti<0.018; V<0.015; Cr<0.04; Fe<0.6; Ni<0.5; Zr<0.07.

The product was an excellent solar grade silicon.

EXAMPLE 2

The starting metallurgical silicon had a content of main impurities, determined by mass spectrophotometry and expressed in ppmw, as follows:

B=20; Al=24,000; P=60; Ti=2,200; V=1,000; Cr=2,600; Fe=16,000; Ni=1,800; Zr=110.

1,000 g of said silicon, ground to sizes less than 50 microns, were mixed with 200 g of BaO.

The resulting mixture melted at a temperature of approximately 1,600° C. in a quartz crucible by means of radio-frequency furnace, and the reaction was allowed to proceed for 3 hours.

After cooling and grinding to a 10–30 mm size, the silicon was digested for 24 hours under stirring in 2 liters of an aqueous solution containing 10% by weight of HCl and 10% by weight of HF.

It was thus possible to obtain a silicon powder having a granulometry of 0.2-2 mm, which was washed and filtered.

The content of impurities, measured by mass spectrophotometry and expressed in ppmw, was the following:

B=5; Al=0.2; P=1; Ti<0.018; V<0.015; Cr<0.04; Fe<0.6; Ni<0.5; Zr<0.07.

The product was an excellent solar grade silicon.

What is claimed is:

1. A process for purifying silicon, characterized in that metallurgical silicon in the molten state is reacted with a barium compound selected from the class consisting of barium carbonate, barium oxide, barium hydroxide, and mixtures thereof at a temperature in the range of 1,550° to 2,000° C. and then, after cooling and crushing, the so reacted silicon is leached with a dilute inorganic acid to yield solar grade silicon having a B content not higher than 5 ppmw, and Al content lower than 1 ppmw, a P content not higher than 1 ppmw, and a total content of other metal impurities lower than 1.5 ppmw.

2. The process of claim 1, characterized in that an oxidizing gas selected from the class consisting of oxygen and water vapor is blown into the molten mass during the reaction.

3. The process of claim 1, characterized in that the barium compound is employed in an amount ranging for 5 to 30% by weight in respect of the weight of silicon to be purified.

4. The process of claim 1, characterized in that the leaching is carried out with an aqueous solution of an inorganic acid selected from the class consisting of hydrochloric acid, hydrofluoric acid, nitric acid, sulphuric acid, and mixtures thereof.

* * * * *